United States Patent
Franklin et al.

(10) Patent No.: US 12,289,430 B2
(45) Date of Patent: Apr. 29, 2025

(54) INSTANT OPTICAL CHARACTER RECOGNITION DURING UPLOAD PROCESS

(71) Applicant: Capital One Services, LLC, McLean, VA (US)

(72) Inventors: Keegan Franklin, Tucson, AZ (US); Christopher Gregory, Damascus, MD (US); Keane Ellis, Stanwood, WA (US); James Brighter, Reston, VA (US); John Maillett, Vienna, VA (US); Suranya Jayan Schott, Arlington, VA (US); Karin Gonzalez, Springfield, VA (US); Xinfeng Dong, Suwanne, GA (US); Charlie Hung, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 216 days.

(21) Appl. No.: 18/092,617

(22) Filed: Jan. 3, 2023

(65) Prior Publication Data
US 2024/0223708 A1    Jul. 4, 2024

(51) Int. Cl.
| | |
|---|---|
| *H04N 1/00* | (2006.01) |
| *G06V 10/94* | (2022.01) |
| *G06V 30/19* | (2022.01) |
| *H04N 1/32* | (2006.01) |

(52) U.S. Cl.
CPC ......... *H04N 1/00482* (2013.01); *G06V 10/95* (2022.01); *G06V 30/19* (2022.01); *H04N 1/00244* (2013.01); *H04N 1/00514* (2013.01); *H04N 1/32106* (2013.01); *H04N 1/3248* (2013.01); *H04N 2201/3276* (2013.01)

(58) Field of Classification Search
CPC ........... H04N 1/00482; H04N 1/00244; H04N 1/00514; H04N 1/32106; H04N 1/3248; H04N 2201/3276; G06V 10/95; G06V 30/19
USPC ........................................... 382/229
See application file for complete search history.

(56) References Cited

U.S. PATENT DOCUMENTS

| | | |
|---|---|---|
| 6,181,837 B1 | 1/2001 | Cahill et al. |
| 8,352,359 B2 | 1/2013 | Viera et al. |
| 9,824,397 B1 * | 11/2017 | Patel .................. G06T 7/60 |
| 11,068,976 B1 | 7/2021 | Voutour et al. |
| 11,069,200 B1 | 7/2021 | Rhodes et al. |
| 2005/0267843 A1 | 12/2005 | Acharya et al. |

(Continued)

OTHER PUBLICATIONS

International Search Report for International Application No. PCT/US24/10187, mailed on Apr. 17, 2024, 7 pages.

*Primary Examiner* — Allen H Nguyen
(74) *Attorney, Agent, or Firm* — Sterne, Kessler, Goldstein & Fox P.L.L.C.

(57) ABSTRACT

Systems for performing instant optical character recognition (OCR) of documents to be uploaded to a server process for allowing mid-stream adjustments during the document upload process. are disclosed. A system may include a mobile device with a document upload application and a backend system to which a document is to be uploaded. The backend system may initiate the OCR process automatically upon receiving images of documents to be uploaded and provide options to the document upload application for managing the upload process based on the results of the OCR process.

20 Claims, 3 Drawing Sheets

(56) References Cited

U.S. PATENT DOCUMENTS

| | | | |
|---|---|---|---|
| 2012/0089706 A1* | 4/2012 | Collins | H04N 1/00973 |
| | | | 709/219 |
| 2013/0148862 A1* | 6/2013 | Roach | G06Q 40/02 |
| | | | 705/39 |
| 2015/0120548 A1* | 4/2015 | Smith | G06Q 20/407 |
| | | | 705/44 |
| 2015/0120563 A1* | 4/2015 | Smith | G06Q 20/10 |
| | | | 705/45 |
| 2017/0061438 A1 | 3/2017 | Patel | |
| 2019/0075172 A1 | 3/2019 | Mande et al. | |
| 2019/0378182 A1 | 12/2019 | Weinflash et al. | |
| 2020/0042837 A1* | 2/2020 | Skinner | H04L 63/102 |
| 2023/0066672 A1* | 3/2023 | Cheng | G06V 10/98 |
| 2023/0133158 A1* | 5/2023 | Kolchin | G06Q 20/0855 |
| | | | 705/39 |

* cited by examiner

INSTANT OPTICAL CHARACTER RECOGNITION DURING UPLOAD PROCESS

TECHNICAL FIELD

Aspects relate to systems and methods for performing instant optical character recognition (OCR) of documents to be uploaded to a server process for allowing mid-stream adjustments during the document upload process.

BACKGROUND

Currently, computer-based (e.g., laptop) or mobile-based (e.g., mobile device) technology allows a user to initiate a document uploading process for uploading images or other electronic versions of a document to a backend system (e.g., a document processing system) for various purposes. In some cases, this technology prevents actions from being performed during the document upload process, i.e., while the document is being uploaded and processed by the backend system. That is, once the user initiates the document upload process, the process will continue until completion without providing any opportunities for the user to make any mid-stream adjustments to the process. This restrictive approach is necessitated in certain document upload processes because such processes have automated routines for receiving the images, processing the images, and completing actions associated with the upload of the images. For example, a user may utilize a mobile deposit application to upload a document associated with a user account, such as a check associated with the user's bank account. Once initiated, the document upload process continues until the check has been uploaded without any further input from the user.

This current process is problematic because a user cannot cancel or otherwise make changes to the upload process as it is occurring. Moreover, the user is typically not given any information about the upload process until after the process has completed when it is too late to cancel or otherwise make changes to the upload.

SUMMARY

Provided herein are system, method, and/or computer program product embodiments, and/or combinations and sub-combinations thereof for performing instant optical character recognition (OCR) of a document for providing an option to cancel a document upload process is disclosed.

An example method embodiment may include steps during a document upload process that may include providing document images to a backend system and providing a customized interface with options for modifying the upload process. Steps of the method may be performed by an upload application on a user device and includes receiving a request to electronically perform the document upload process to update a user account by uploading the document to a server system; transmitting, to a server system, a front image of the document and a back image of the document; transmitting an OCR request to perform an instant OCR scan of the front image of the document and the back image of the document; and receiving, responsive to the transmitting the OCR request, a risk assessment from the server system. In embodiments, the risk assessment may include an availability schedule associated with uploading the document to the user account and specifies a time period, such as a number of days, for when contents of the document, such as a monetary value specified in the document, will be available in the user's account. Steps may further include displaying the risk assessment and an option to cancel the document upload process.

Another example method embodiment may include steps during a document upload process that may include receiving document images, performing OCR on the document images, and determining a risk assessment associated with the document images to be provided for display on a customized interface for modifying the upload process. Steps of the method may be performed by backend system and include receiving, from an upload application, a front image of the document and a back image of the document; receiving, from the upload application by an OCR component of the server system, an OCR request to perform an OCR scan of the front image of the document and the back image of the document; determining, by the OCR component based on receiving the OCR request, a content of the document and a user account associated with the upload application; determining, by a risk assessment module of the server system, a risk assessment associated with uploading the document to the user account, wherein the risk assessment includes an availability schedule regarding when the content associated with the document will be available for use by the upload application; and transmitting, by the server system to the upload application, the risk assessment.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the leftmost digit(s) of a reference number identifies the drawing in which the reference number first appears.

DETAILED DESCRIPTION

Figure 1:
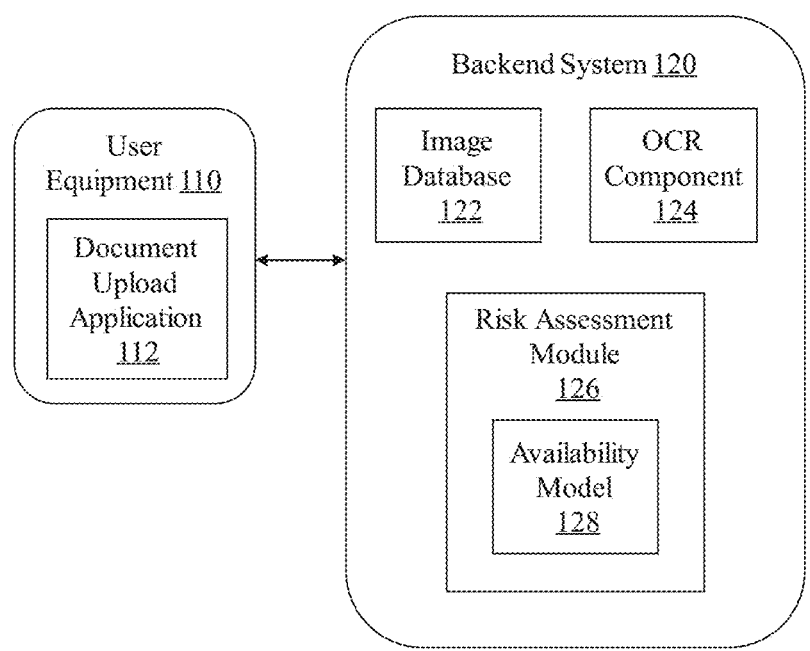
FIG. 1 is an exemplary document upload environment for providing mid-stream adjustments to a document upload process according to aspects of the present disclosure.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

Provided herein are a method, a system, computer program product embodiments, and/or combinations and sub-combinations thereof for providing mid-stream adjustments to a document upload process based on conditions detected in the document during the upload process.

In some embodiments, the technology described herein provides a system that enables adjustments to a document upload process, and in particular, to an upload process with automated routines that typically prevented a user from cancelling or otherwise making changes during the upload. The user may be required to upload one or more documents in regards to various applications. For example, the user may be required to upload a copy of a check, his/her driver's license, tax returns for the last two years, etc. The user may then upload these documents using user equipment (UE). Such UE may be a computer, a laptop, a desktop, a mobile phone, a tablet, etc. The user may upload the document using an application or a web browser running on the UE.

In some embodiments, the technology disclosed herein provides a workflow that includes instant optical character recognition (OCR) of document images taken by a document upload application. The term "instant OCR" may refer to an OCR process that is initiated automatically without user input and, in some instances, automatically upon the document upload application receiving images of the document to be uploaded. In some embodiments, the OCR process is performed by a backend system and not by the document upload application. In a non-limiting example, the technology disclosed herein triggers transmission, from a document upload application to the backend system, of document images upon receiving one of a first document image or a second document image. The technology described herein improves the technology associated with uploading documents by preemptively performing certain steps of the document upload process without having to wait for a user instruction.

In some embodiments, the technology disclosed herein provides a system that may automatically detect, based on performing optical character recognition (OCR) of an image to be uploaded, content of the document that is being uploaded and the user account to which the document is being uploaded. Based on the detected content of at least one of the document and the user account, the system may provide options to the user during the upload process that enable the user to make changes (e.g., cancel) the upload. The system may display the detected content of the document, results of processing the content of the document (such as the result of running the content through a risk assessment model for assessing the possibility of fraud or risk in continuing the document upload process) and also display options for continuing, cancelling, or otherwise modifying the upload based on the detected content. One result of the risk assessment is that funds may not be made available to the user as quickly as desired. Thus, in this example, the user is allowed to cancel the transaction and obtain the funds in a different manner (e.g., presenting to the issuing bank). If the system continues with the upload, the system may update a user record associated with the user account based on contents of the document.

For example, in an embodiment when the document to be uploaded is a check, the user account is the user's bank account (e.g., checking or savings) into which the funds specified by the check are to be deposited. Content associated with the document include the funds or monetary amount to be deposited to the user account, the issuing bank, the routing number, and the account number. Content associated with the user account may include a risk profile associated with the account and the current balance of the account. Options associated with a check upload process may include continuing with the upload process or cancelling the upload process (and thereby cancelling depositing the check into the account).

In some embodiments, the technology disclosed herein includes different implementations for initiating the instant OCR of document images to the backend system. For example, the technology disclosed herein may dynamically add a request tag to one or more of the document images that are transmitted to the backend system with the request tag indicating that instant OCR is to be performed. As another example, the document upload application may upload the document images and provide an OCR API call as separate communications to the backend system, with the OCR API call instructing the backend system to perform the OCR process immediately on the uploaded document images.

In some embodiments, the technology disclosed herein provides document information associated with the document images so that mid-stream changes may be made to the document upload process. In a non-limiting example, the technology disclosed herein provides a user interface (UI) for taking document images, displaying the document information, and providing the mid-stream options to the user with the mid-stream options being based on the document information processed by the backend system.

Therefore, the technology described herein solves one or more technical problems that exist in the realm of online computer systems and in particular, with automated document upload processes that typically prevent a user from making changes to the process once it is has been initiated. This problem is rooted in the typical communications between a document upload application installed on a user equipment and a backend system where the upload process and subsequent processing only occur after receiving user input via the document upload application. Another problem is that, once initiated, the document upload process continues unabated until the backend system completes the upload process as well as any additional processing (e.g., funds availability). The technology as described herein provides an improvement in the communications between the document upload application and the backend system and enables users to make mid-stream adjustments to the upload process. One or more solutions described herein are necessarily rooted in computer technology through the modification of communications between the document upload application and the backend system. The technology described herein reduces or eliminates the problem of conventional document upload processes as will be described in the various embodiments of FIGS. 1-3.

Various embodiments of these features will now be discussed with respect to the corresponding figures.

FIG. 1 is an exemplary document upload environment 100 for providing mid-stream adjustments to a document upload process according to aspects of the present disclosure. In one example, environment 100 comprises user equipment 110 and backend system 120.

In an exemplary embodiment, user equipment 110 may be implemented as a mobile device such as a smartphone or a tablet. User equipment 110 may include a document upload application 111 that is configured to connect with backend system 120, which may include an image database 122, an OCR component 124, and risk assessment module 126, which may further include an risk model 128.

Document upload application 111 may be configured to display a graphical user interface on user equipment 110. The graphical user interface may provide the ability to receive images of documents to be uploaded to backend system 120. Document upload application 111 may include a camera function that utilizes a camera (not shown) of user equipment 110 to capture one or more images of a document to be uploaded to the backend system 120.

In a conventional upload process, a conventional upload application will only upload images of the document after receiving an explicit instruction from the user to upload the image. After receiving the explicit instruction, the conventional upload application will initiate the irreversible upload process whereby the document is uploaded. For example, when implemented in the context of a mobile deposit process, the upload application will upload the check to the bank which will automatically perform the deposit into the user's bank account. After completion, the convention upload application may then present the results of the deposit, such as a funds availability schedule as to when the funds associated with the check will be available (e.g., for withdrawal) to the user.

As previously noted, techniques of the present disclosure provide a number of improvements over this conventional upload process. Instead of waiting for a user instruction to transmit the document images and initiate the document upload process, document upload application 111 may be configured to automatically transmit images of the document upon capturing the images and before receiving any user input to either initiate the upload process or transmit the images to the backend system 120. Automatic transmission of the document images to backend system 120 enables the backend system 120 to preemptively initiate certain steps in anticipation of receiving an instruction from the document upload application 111 to start the process. These preemptive steps may include performing OCR on the images using OCR component 124 to identify content of the document to be uploaded and of the accounts associated with the document. There are two advantages to performing these steps preemptively, i.e., prior to receiving a user instruction. First, backend system 120 may initiate steps of the document upload process such as detecting relevant content of the document and generating predictions for the process such as, in the context of mobile check deposit, determining when funds associated with the check will be available for withdraw from the user's account.

In some embodiments, document upload application 111 may be configured with separate application programming interface (API) calls for initiating different aspects of the document upload process. For example, document upload application 111 may include an OCR API call that is triggered upon receiving one or more document images by document upload application 111 and a Post API call that that is triggered upon receiving a user instruction to proceed with the document upload.

For the OCR API call, document upload application 111 may capture a first image of a document, such as the first page or the front of the document, and a second image of the document, such as additional pages or the back of the document. Document upload application 111 may be configured to trigger an OCR API call immediately upon capturing the first image or wait for subsequent images such as the second image to be captured. Document upload application 111 may be further configured to modify one or more of the document images to include an OCR request tag as part of the OCR API call. Backend system 120 may be configured to detect the OCR request tag and, upon detection, transmit the document images to OCR component 124.

In some embodiments, OCR component 124 receives the document images transmitted from document upload application 111, performs OCR on the document images, and may pass results of the OCR process to risk model 128. OCR component 124 may detect content of the document that may be used for further processing by components of backend system 120 such as risk model 128. The detected content may generally be used by backend system 120 to process the document. In an embodiment involving a check to be deposited into a user's account, OCR component 124 may detect the check amount, the routing number of the issuing bank, the account number identifying the account where the money for the check will be withdrawn.

In some embodiments, the document upload process may include additional processing steps after backend system 120 receives the document image(s) from the document upload application 111 and performs OCR on the document images. Examples of additional processing include performing actions associated with the document such as storing the document in a storage location and executing functions associated with the content in the document and the user account such as determining a risk assessment associated with uploading the document to the user account.

For the Post API call, document upload application 111 may display a graphical user interface with an option for the user to either continue or cancel the document upload process. The graphical user interface may further include document information received from the backend system 120 after it has processed the document images such as performing OCR on the document images and performing the additional processing steps on the content of the document. Document upload application 111 may receive an instruction to continue with the document upload process based on displaying the document information and results of the additional processing steps allows the user. The instruction to continue with the document upload process triggers the document upload application 111 to transmit the Post API call to backend system 120 to proceed with the next steps of the document upload process which includes updating a user record (e.g., balance) associated with the user account (e.g., checking account). An instruction to cancel the document upload process causes the document upload application 111 to transmit an instruction to backend system 120 to purge the document image(s) that were stored and end the document upload process.

In aspects, the backend system 120 may be implemented as one or more servers. Backend system 120 may be implemented as a variety of centralized or decentralized computing devices. For example, the server 104 may be a mobile device, a laptop computer, a desktop computer, grid-computing resources, a virtualized computing resource, cloud computing resources, peer-to-peer distributed computing devices, a server farm, or a combination thereof. Backend system 120 may be centralized in a single device, distributed across multiple devices within a cloud network, distributed across different geographic locations, or embedded within a network. The server 104 can communicate with other devices, such as a user equipment 110. Components of backend system 120, such as image database 122, an OCR component 124, and a risk model 128 may be implemented within the same device (such as when backend system 120 is implemented as a single device) or as separate devices (such as when backend system 120 is implemented as a distributed system with components connected via a network).

Image database 122 in backend system 120 may be implemented as network storage resources (e.g., Amazon S3®, Storage Area Network (SAN), Network File System (NFS), etc.) and is configured to store document images received from document upload applications.

Risk assessment module 126 in backend system 120 may be implemented as a computing device that assesses a level of risk of proceeding with the document upload process. This risk assessment may be based on passing the content of the document detected by the OCR component 124 as inputs to a trained risk model 128. Risk model 128 may be implemented as a machine learning model trained for fraud and risk detection of documents to be uploaded to user accounts associated with backend system 120. That is, given a particular document and its document content, risk model 128 is trained to determine the likelihood of fraud or risk involved with the uploading the document to the user account. In embodiments where the document is a check, risk model 128 may be trained to generate the risk assessment based on the user account into which the check is to be deposited and the check contents such as the check amount, the account number, and the routing number. The risk assessment may reflect a level of trust that the content of the check is accurate and the likelihood of potential fraudulent activity. Certain factors may increase the risk such as a check amount, the routing number, and the accounts associated with the document upload process (both the account associated with the account number on the check and the user account). For example, check amount above a certain threshold (e.g., $5,000) may raise the risk, the bank indicated by the routing number may be less reputable (e.g., based on a reputation ranking of known banks), and a newer user account may be at higher risk because of the lack of activity history and trend information for that user account.

In additional embodiments, a risk assessment for a check to be uploaded to backend system 120 and deposited into a user account may result in the generation of a funds availability schedule for that particular check. A funds availability schedule reflects the assessed risk for the check that is being uploaded and indicates the period of time until the funds in the check are available to the user (i.e., how long the backend system 120 will hold the funds before releasing them into the user account) starting from the completion of the document upload process for that check. A check determined by risk model 128 to be high risk may result in a different funds availability schedule (i.e., a longer hold period) from a check determined to be low risk. Prolonging the length of time for when funds are made available mitigates risk for the backend system 120 by ensuring that the funds associated with that check are provided to the backend system 120 (e.g., if the check bounces, if the check was deposited at another backend system).

The output of risk model 128 may be the risk assessment for the document, the options associated with the document and generated based on the risk assessment, or both. The output may be transmitted from backend system 120 to user equipment 110 for display on a graphical user interface by document upload application 111. In addition to displaying the output of risk model 128, document upload application 111 may pause, or otherwise interrupt, the document upload process by displaying an interface on a display of user equipment. The interface may be customized to include different options for uploading the document based on at least one of the risk assessment associated with the document and user preferences stored with document upload application 111. Document upload application 111 may customize the interface based on the output of risk model 128 as discussed above.

Other interface customizations may include automatic continuance or cancellation of the upload based on the risk assessment. A risk assessment may indicate a duration of time (e.g., 1 day, 3 days) until contents of the document become available for use in the user account. This duration of time may depend on risk factors associated with the document and the user account and provides security to the backend system 120 to guard against any potential fraudulent activity. For example, the higher risk associated with uploading the document to the user account, the greater the duration of time needed to guard against fraudulent activity. A user preference of the document upload application 111 may indicate a threshold for the risk assessment for either automatically continuing or cancelling the upload. For example, a user preference for this feature may set to a particular number of days (e.g., 2 days) and if the risk assessment indicates that a greater number of days is required before the contents of the document are available in the user account, document upload application 111 may automatically cancel the upload. In this example, if the risk assessment indicates a lesser number of days, then document upload application 111 may automatically proceed with the upload. In either case, document upload application may customize the interface to display the automatically performed action to the user.

The modules described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the environment 100 or installed as a removable portion of the environment 100.

Environment 100 can be used in a variety of areas implementing document upload techniques. These include financial applications, security applications, etc. where documents being uploaded into user accounts may be subject to fraudulent activity. For example, when processing important document such as driver's licenses, checks, financial documents, etc. The environment 100 allows for determined risk associated with these documents and user accounts to be preemptively calculated prior to completion of the document upload process and also allows for the document upload process to be cancelled prior to completion based on that determined risk.

Methods of Operation

Figure 2:
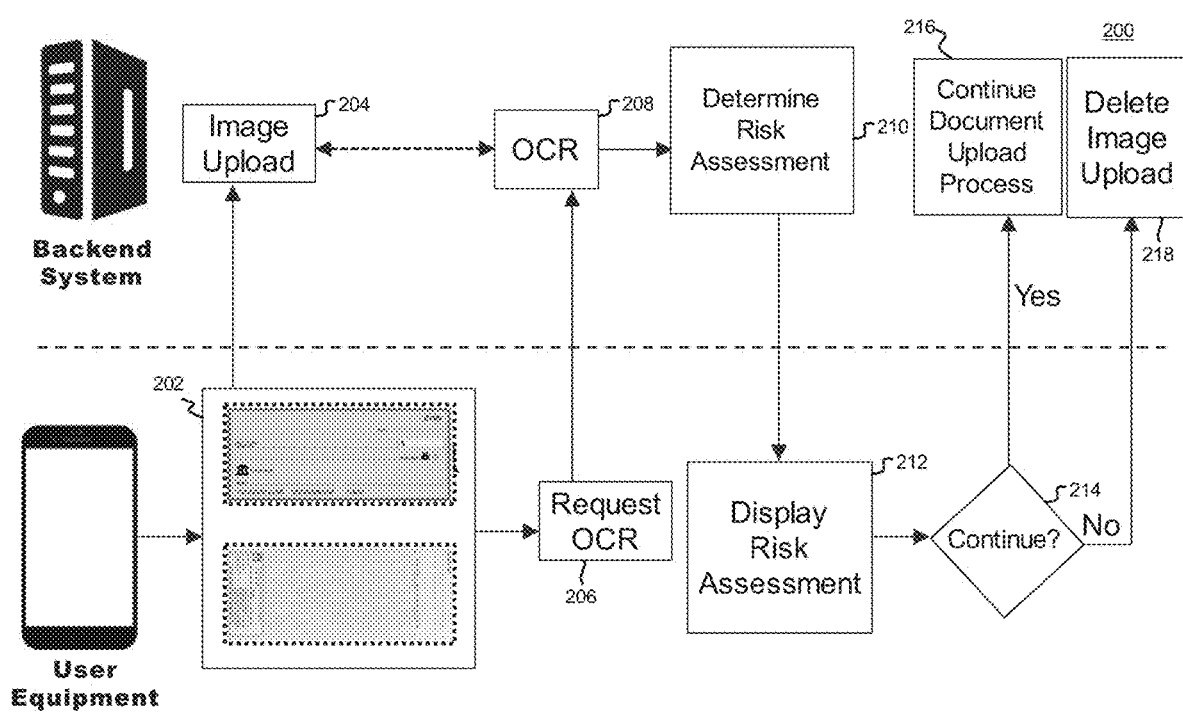
FIG. 2 is an example flowchart of a document upload process that includes performing instant optical character recognition of a document according to aspects of the present disclosure.

FIG. 2 is an example method 200 of operating the environment 100 to perform instant OCR of document images to be uploaded to a user account and provide options to make a mid-stream adjustment to the upload process according to aspects of the present disclosure. As a non-limiting example with regards to FIG. 1, one or more processes described with respect to FIG. 2 may be performed by one or more devices of environment 100. In such an embodiment, the one or more devices of environment 100 may execute code in memory to perform certain steps of method 200. While method 200 of FIG. 2 will be discussed below as being performed by one or more components of environment 100, other devices not shown may store the code and therefore may execute method 200 by directly executing the code. Accordingly, the following discussion of method 200 will refer to devices of FIG. 1 as an exemplary non-limiting embodiment of method 200. Moreover, method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art(s).

At step 202, document upload application 112 installed in user equipment 110 receives document images of a document to be uploaded to backend system 120. In some embodiments, document upload application 112 may be configured with a parameter indicating the number of document images to be captured of the document to be uploaded. For example, the graphical user interface provided by document upload application 112 may be configured to require capturing both a front image of the document and a second image of the document. Document upload application may receive a request to electronically perform the document upload process.

At step 204, document upload application 112 transmits the document images to backend system 120, which may cache the received images in a temporary location such as an S3 bucket implemented with a cache control.

At step 206, document upload application 112 transmits an OCR request to backend system 120 to perform OCR on the document images uploaded. In some embodiments, the OCR request may be implemented as a request tag that is incorporated into one or more of the document images transmitted by document upload application 112. For example, document upload application 112 may modify the front image of a check or the back image of the check to include the request tag before transmitting the front image or the back image to the backend system. In embodiments, the request tag may only be included in one of the document images. In other embodiments, the OCR request may be implemented as a separate API call transmitted by document upload application 112 after determining that all images of the document have been captured. In some embodiments, document upload application 112 does not need to send a separate OCR request or attach a request tag to the document images. Instead, the documents images by themselves may serve as a trigger for backend system 120 to perform OCR.

At step 208, backend system 120 performs OCR on the document images to detect contents of the document after receiving the OCR request from document upload application 112. For example, backend system 120 may detect a monetary amount specified in a check. In embodiments, the detected contents are needed to determine a risk associated with uploading the document to the user account including updating the user account based on the contents of the document. The risk may reflect a likelihood of success that the user account can be updated to reflect the contents of the document. In some embodiments, backend system 120 performs OCR on the document images without receiving an OCR request from document upload application 112 and based upon detecting that all document images have been received from document upload application 112.

At step 210, risk assessment module 126 of backend system 120 determines a risk assessment associated with uploading the document to the user account. The risk assessment module 126 may receive, as inputs, detected contents from the OCR as well as information associated with the user account such as account history and transaction history. The output of the risk assessment module 126 is a risk assessment that is based on the provided inputs. In some embodiments, the risk assessment includes an availability schedule associated with uploading the document to the user account. For example, the availability schedule provides a time period, such as a number of days, for when contents of the document, such as a monetary value specified in the document, will be available in the user's account.

At step 212, document upload application 112 receives and displays the risk assessment including additional options for either continuing or cancelling the document upload process. In embodiments, document upload application 112 displays a graphical user interface with the risk assessment and user selectable options to continue or cancel the document upload process.

At step 214, document upload application 112 determines whether to continue with or cancel the document upload process based on the user selected option from the graphical user interface.

At step 216, after receiving a continue instruction from document upload application 112, backend system 120 continues the document upload process. In embodiments, backend system 120 proceeds with uploading the contents of the document into the user account.

At step 218, after receiving a cancel instruction from document upload application 112, backend system 120 cancels the document upload process including purging the document images from its memory.

Components of the System

Figure 3:
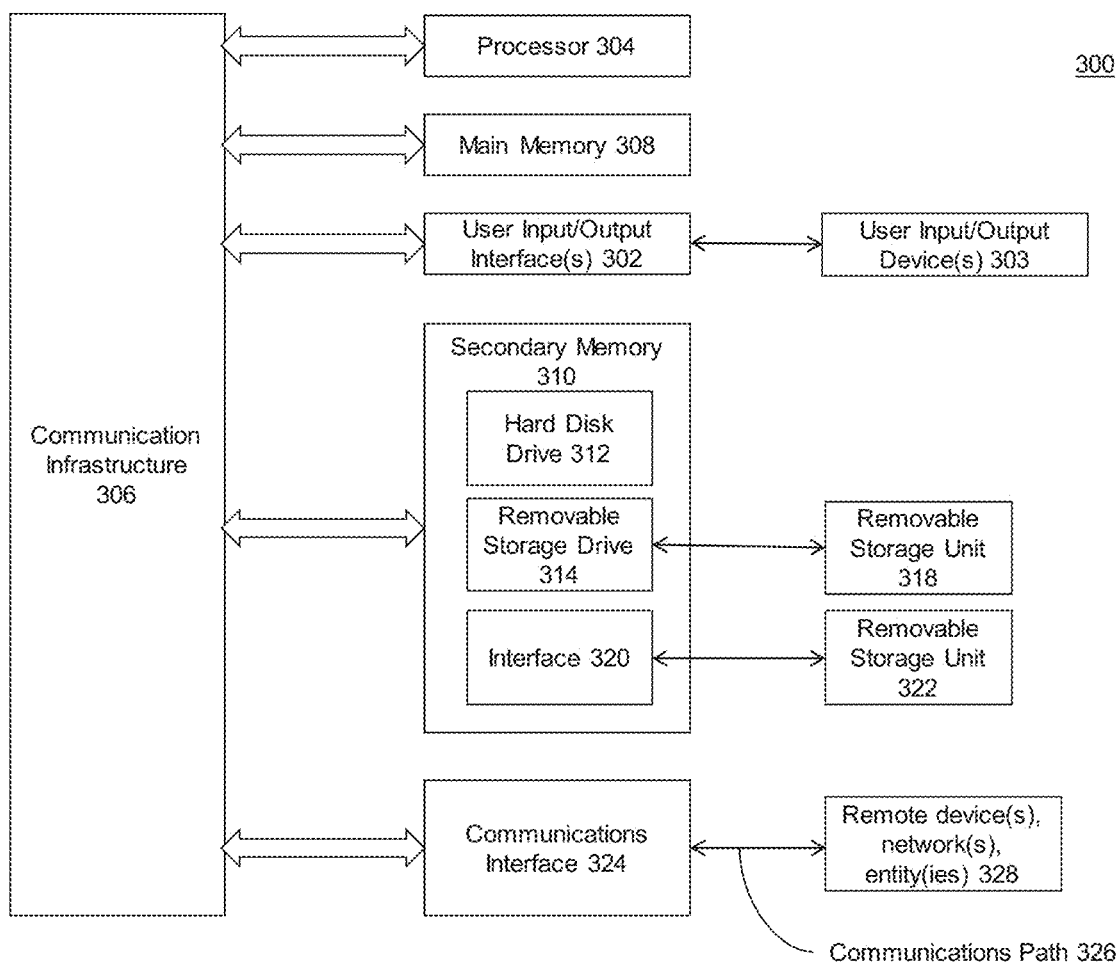
FIG. 3 is an example architecture of devices that can be used to implement the system according to aspects of the present disclosure.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The above detailed description and aspects of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

These and other valuable aspects of the aspects of the present disclosure consequently further the state of the technology to at least the next level. While the disclosed aspects have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer-implemented method for performing instant optical character recognition (OCR) of a document to provide an option to cancel a document upload process, the method comprising:
   receiving, by an upload application on a user device, a request to electronically perform the document upload process to update a user account by uploading the document to a server system;
   transmitting, by the user device to the server system and based on receiving the request, a front image of the document and a back image of the document;
   transmitting an OCR request to perform an instant OCR scan of the front image of the document and the back image of the document;
   receiving, by the upload application and responsive to the transmitting the OCR request, a risk assessment from the server system, wherein the risk assessment includes an availability schedule associated with uploading the document to the user account; and
   displaying, by the upload application, the risk assessment and an option to cancel the document upload process.

2. The computer-implemented method of claim 1, the method further comprising:
   receiving, by the user device, a user response to the option to cancel the document upload process.

3. The computer-implemented method of claim 2, wherein the user response is a proceed instruction to continue the document upload process and the method further comprising:
   transmitting, by the user device to the server system, the proceed instruction.

4. The computer-implemented method of claim 3, wherein the document upload process is prevented from continuing until the server system receives the proceed instruction.

5. The computer-implemented method of claim 2, wherein the user response is a cancel instruction to cancel the document upload process and the method further comprising:
   transmitting, by the user device to the server system, the cancel instruction, wherein the cancel instruction is configured to cause the server system to purge the front image of the document and the back image.

6. The computer-implemented method of claim 1, wherein the user device transmits the OCR request separately from the front image of the document and the back image of the document.

7. The computer-implemented method of claim 1, wherein the user device transmits the OCR request with at least one of the front image of the document or the back image of the document.

8. The computer-implemented method of claim 1, wherein the availability schedule provides a time period for when contents of the document will be available for use by the upload application.

9. A computer-implemented method for performing instant optical character recognition (OCR) of a document for providing an option to cancel a document upload process, the method comprising:
   receiving, from an upload application by a server system, a front image of the document and a back image of the document;
   receiving, from the upload application by an OCR component of the server system, an OCR request to perform an OCR scan of the front image of the document and the back image of the document;
   determining, by the OCR component based on receiving the OCR request, a content of the document and a user account associated with the upload application;
   determining, by a risk assessment module of the server system, a risk assessment associated with uploading the document to the user account, wherein the risk assessment includes an availability schedule regarding when the content associated with the document will be available for use by the upload application; and
   transmitting, by the server system to the upload application, the risk assessment.

10. The computer-implemented method of claim 9, wherein the contents comprises a monetary amount to be deposited to the user account managed by the upload application, and the method further comprising:
    receiving, by the server system and subsequent to transmitting the availability schedule, a user response from the upload application, wherein the user response is one of a proceed instruction to continue the document upload process or a cancel instruction to cancel the document upload process.

11. The computer-implemented method of claim 10, wherein responsive to the user response being the proceed instruction, the method further comprising:
    posting the monetary amount to the user account associated with the upload application.

12. The computer-implemented method of claim 11, wherein the document upload process is prevented from continuing until the server system receives the proceed instruction.

13. The computer-implemented method of claim 10, wherein responsive to the user response being the cancel instruction, the method further comprising:
purging the front image of the document and the back image of the document from a memory of the server system without proceeding with the document upload process.

14. The computer-implemented method of claim 10, wherein the server system receives the OCR request separately from the front image of the document and the back image of the document.

15. The computer-implemented method of claim 10, wherein the server system receives the OCR request with at least one of the front image of the document or the back image of the document.

16. A non-transitory computer-readable medium storing instructions, the instructions, when executed by a processor on a user device executing a document upload process for an record associated with a document, cause the processor to perform operations comprising:
receiving, by an upload application on a user device, a request to electronically perform the document upload process to update a user account by uploading the document to a server system;
transmitting, by the user device to the server system and based on receiving the request, a front image of the document and a back image of the document;
transmitting an OCR request to perform an instant OCR scan of the front image of the document and the back image of the document;
receiving, by the upload application and responsive to the transmitting the OCR request, a risk assessment from the server system, wherein the risk assessment includes an availability schedule associated with uploading the document to the user account; and
displaying, by the upload application, the risk assessment and an option to cancel the document upload process.

17. The non-transitory computer-readable medium of claim 16, the operations further comprising:
receiving, by the user device, a user response to the option to cancel the document upload process.

18. The non-transitory computer-readable medium of claim 17, wherein the user response is a proceed instruction to continue the document upload process and the operations further comprising:
transmitting, by the user device to the server system, the proceed instruction.

19. The non-transitory computer-readable medium of claim 17, wherein the user response is a cancel instruction to cancel the document upload process and the operations further comprising:
transmitting, by the user device to the server system, the cancel instruction, wherein the cancel instruction is configured to cause the server system to erase the front image of the document and the back image of the document.

20. The non-transitory computer-readable medium of claim 16, wherein the availability schedule provides a time period for when contents of the document will be available for use by the upload application.

\* \* \* \* \*